United States Patent
Steeby

(10) Patent No.: US 6,482,123 B2
(45) Date of Patent: Nov. 19, 2002

(54) METHOD OF CONTROLLING HEAT BUILDUP IN A CLUTCH

(75) Inventor: Jon A. Steeby, Schoolcraft, MI (US)

(73) Assignee: Eaton Corporation, Cleveland, OH (US)

( * ) Notice: Subject to any disclaimer, the term of this patent is extended or adjusted under 35 U.S.C. 154(b) by 2 days.

(21) Appl. No.: 09/764,723

(22) Filed: Jan. 18, 2001

(65) Prior Publication Data

US 2002/0123410 A1 Sep. 5, 2002

(51) Int. Cl.$^7$ .............................................. F16H 59/64
(52) U.S. Cl. ...................................................... 477/98
(58) Field of Search ................................ 477/166–178, 477/97, 98, 115; 701/67, 68; 192/58.64

(56) References Cited

U.S. PATENT DOCUMENTS

| | | | |
|---|---|---|---|
| 4,576,263 A | 3/1986 | Lane et al. | 192/0.044 |
| 6,019,703 A * | 2/2000 | Black et al. | 192/82 T |
| 6,146,309 A * | 11/2000 | Nishino et al. | 477/168 |

* cited by examiner

Primary Examiner—Matthew C. Graham
Assistant Examiner—C. T. Bartz
(74) Attorney, Agent, or Firm—Rader, Fishman & Grauer PLLC

(57) ABSTRACT

An automatic clutch control method and system includes steps for controlling a vehicle master clutch to prevent the clutch from destructively overheating due to excessive slipping. A heat buildup value is determined from various engine operating parameters, such as output torque, engine speed, and input shaft speed. The heat buildup value can be increased or decreased depending on the various engine operating parameters. A signal generating device is responsive to the heat buildup value exceeding a first predetermined heat buildup limit to generate a clutch protection output signal effective to cause the clutch to be operated in an aggressive mode of operation to fully engage the clutch at a faster rate. The signal generating device is also response to the heat build value exceeding a second predetermined heat buildup limit and slow vehicle speed to generate a clutch protection output signal effective to cause the clutch to be operated in a fully disengaged mode of operation.

39 Claims, 2 Drawing Sheets

METHOD OF CONTROLLING HEAT BUILDUP IN A CLUTCH

FIELD OF THE INVENTION

The present invention relates to clutch controls for automatically controlling the engagement and disengagement of transmission master clutches, and more particularly relates to clutch controls for master clutches utilized with mechanical transmissions, in particular with automatic mechanical transmission systems, which simulate the current clutch operating surface temperatures and automatically operate the clutch in response to a simulated temperature greater than a predetermined limit.

BACKGROUND OF THE INVENTION

Automatic mechanical transmission systems and the automatic controls for the master clutches thereof are known in the prior art as may be seen by reference to U.S. Pat. Nos. 3,478,851; 3,752,284; 4,019,614; 4,038,889; 4,081,065 and 4,361,061, the disclosures of which are hereby incorporated by reference.

Briefly, in such automatic mechanical transmissions systems, various drive line operations include the supply of fuel to the engine, the engagement and disengagement of the master clutch, the shifting of the transmission and the operation of other devices such as input or output shaft brakes are automatically controlled by a control system, including a central processing unit, based upon certain measured, sensed and/or calculated input parameters. Typically, the input parameters include engine speed, throttle position, transmission input and/or output shaft speed, vehicle speed, current engaged gear ratio, application of the brakes and the like. The term throttle position is utilized to signify the position or setting of any operator controlled device for controlling the supply of fuel to an engine.

Referring specifically to the automatic clutch control, in a vehicle equipped with an automatic mechanical transmission, during normal operation, when starting from at rest or operating at a very low speed, the master friction clutch is modulated between fully disengaged and fully engaged conditions, i.e. is partially engaged, according to certain input parameters, to maintain the engine speed at a set value above idle speed and/or to achieve smooth starts. Typically, the set value is throttle position modulated to provide appropriate starting torque and the clutch is moved toward engagement and disengagement, respectively, as the engine speed increases above and falls below, respectively, the set value.

In another system, as described in U.S. Pat. No. 4,081,065, the clutch is modulated in accordance with throttle position, engine speed and engine acceleration.

While the above automatic mechanical transmission systems are considered to be highly advantageous, they are not totally satisfactory as, in certain start up conditions when the vehicle does not have sufficient torque in the selected gear to move the vehicle load or the vehicle does not have sufficient traction to move the load, the operator may allow the clutch to remain in the partially engaged (i.e. slipping) position for an excessive period of time which may result in excessive heat buildup in the clutch and damage thereto. Such conditions can occur in starts up a steep grade and/or in mud, sand or snow.

Clutch control systems utilizing temperature sensors, such as bi-metalic reed devices and the like, located in the clutch are known in the prior art as may be seen by reference to U.S. Pat. Nos. 4,072,220 and 4,199,048, the disclosures of which are hereby incorporated by reference. Automatic clutch controls having means to simulate heat buildup by monitoring throttle position and slip are known as may be seen by reference to above-mentioned U.S. Pat. No. 4,081,065.

In another automated clutch control system, as described in U.S. Pat. No. 4,576,263, the clutch is modulated in accordance with throttle position, engine speed and engine acceleration by simulating clutch temperature utilizing sensed and/or calculated inputs.

The prior art systems for monitoring and/or simulating clutch temperature to prevent heat related damage thereto are not totally satisfactory as the systems did not provide adequate automatic response to sensed conditions. They also did not interact with related automatic mechanical transmission system parameters. They often utilized relatively complicated, unreliable and/or expensive sensors which were difficult and/or expensive to produce, assemble and/or maintain. Further, the prior art systems did not measure temperature at the operating (i.e. friction) surfaces or simulate clutch heating and clutch cooling conditions to accurately simulate current clutch temperature and/or based each temperature simulation from a fixed starting point not related to a constantly maintained current temperature simulation.

SUMMARY OF THE INVENTION

In accordance with the present invention, the drawbacks of prior art have been overcome or minimized by providing a heat dissipation prediction method of controlling heat buildup in the clutch to protect the clutch from excessive wear and/or damage resulting from heat buildup at the friction surfaces during excessively long and/or repeated clutch slipping operations. Such undesireable clutch slipping operations can be caused to occur by inexperienced, unskilled and/or inattentive operator attempts to start the vehicle under unsuitable traction conditions, attempting to start the vehicle with insufficient torque in the selected gear ratio (often associated with attempting to start a heavy loaded vehicle up a steep grade) and/or driver riding the throttle to maintain a vehicle stationary on a hill.

The heat dissipation prediction method comprises the steps of determining a heat buildup value based on an engine operating parameter, comparing the heat buildup value with a first predetermined heat buildup limit, comparing the heat buildup value with a second predetermined heat buildup limit, and setting an operating mode of the clutch based on the heat buildup value.

The heat buildup value will be increased or decreased based on comparing the various operating parameters with a baseline threshold and a baseline slip. The clutch will be caused to engage more rapidly in an aggressive mode of operation to cease slip related heat buildup when the heat buildup value is greater than a first predetermined heat buildup limit. When the heat buildup value exceeds a second predetermined heat buildup limit and the vehicle speed is slow, the clutch will be caused to rapidly disengage in a fully disengage mode of operation. Thus, the clutch will be caused to become fully disengaged or more rapidly engaged based on the heat buildup value.

Accordingly, it is an intent of the present invention to provide an automatic clutch control system for determining a heat buildup value from sensed and/or calculated inputs and for operating the clutch to minimize or prevent excessive wear and/or damage thereto resulting from slip related temperature buildup.

Various additional aspects and advantages of this invention will become apparent to those skilled in the art from the following detailed description of the preferred embodiment, when read in light of the accompanying drawings.

DETAILED DESCRIPTION OF PREFERRED EMBODIMENTS

Figure 1:
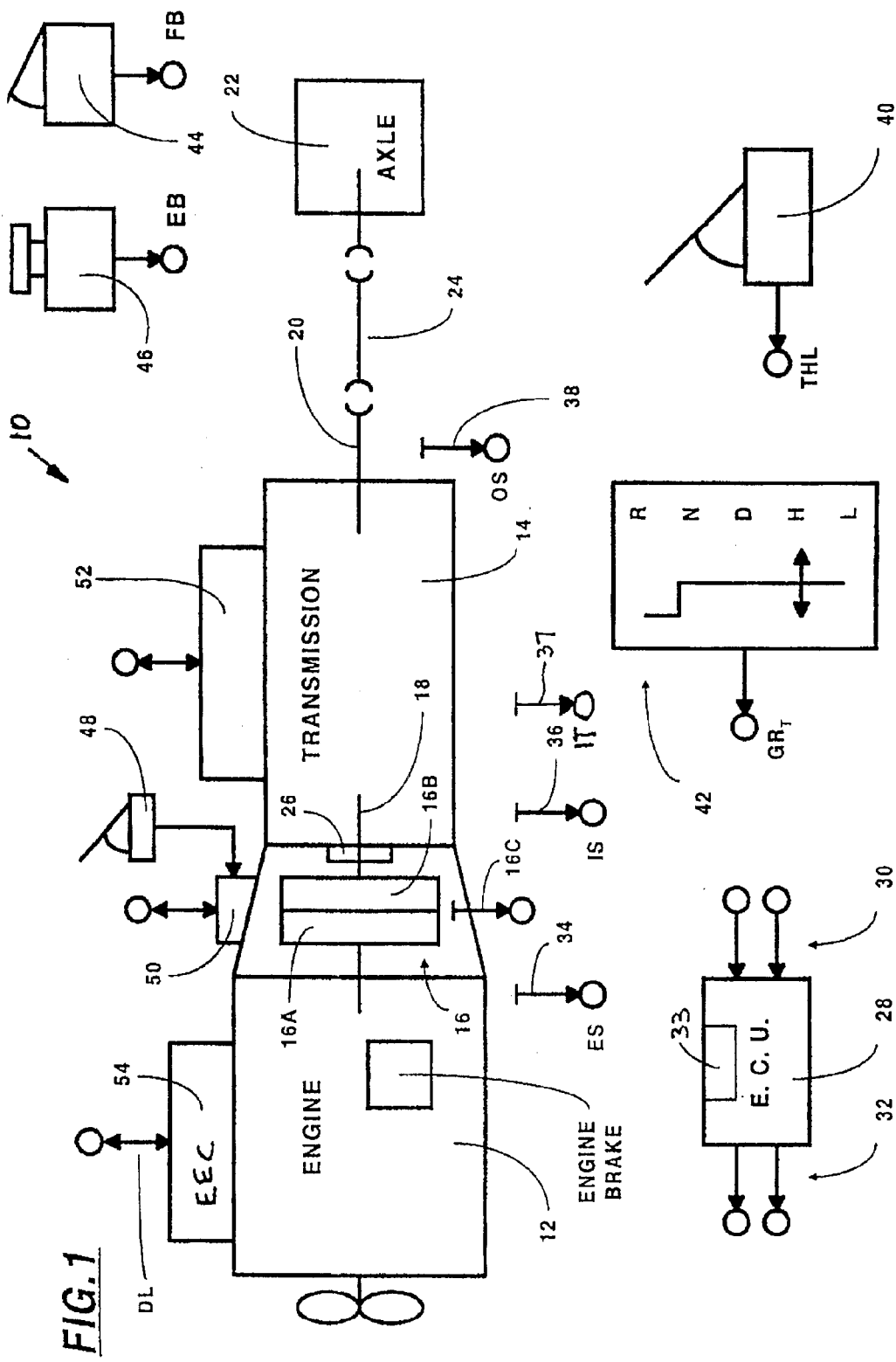
FIG. 1 is a schematic illustration, in block diagram format, of an automated mechanical transmission system utilizing the integral gear life monitor system of the invention.

Referring now to the drawings, there is schematically illustrated in FIG. 1 an at least partially automated mechanical transmission system 10 intended for vehicular use. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 6, 7, 8, 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. See U.S. Pat. Nos. 5,634,541, 5,450,934 and 5,908,100, herein incorporated by reference. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445, herein incorporated by reference. A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986, herein incorporated by reference.

System 10 includes a rotational speed sensor 34 for sensing rotational speed of the engine and providing an output signal (ES) indicative thereof, a rotational speed sensor 36 for sensing the rotational speed of the input shaft 18 and providing an output signal (IS) indicative thereof, a torque sensor 37 for sensing the torque of the input shaft 18 and providing an output signal (IT), and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal ($GR_T$) indicative thereof.

As is known, if the clutch is engaged, the rotational speed of the engine may be determined from the speed of the input shaft and/or the speed of the output shaft and the engaged transmission ratio ($ES=IS=OS*GR_T$).

System 10 also may include sensors 44 and 46 for sensing operation of the vehicle foot brake (also called service brake) and engine brakes, respectively, and for providing signals FB and EB, respectively, indicative thereof.

The master clutch 16 may be controlled by a clutch pedal 48 or by a clutch actuator 50 responding to output signals from the ECU 28.

Alternatively, an actuator responsive to control output signals may be provided, which may be overridden by operation of the manual clutch pedal. In the preferred embodiment, the clutch is manually controlled and used only to launch and stop the vehicle (see U.S. Pat. Nos. 4,850,236; 5,272,939 and 5,425,689, herein incorporated by reference). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391, herein incorporated by reference. Actuator 52 may shift the main and/or auxiliary section of transmission 14. The engaged and disengaged (i.e., "not engaged") condition of clutch 16 may be sensed by a position sensor 16C or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE J1939 and/or ISO 11898. The ECU 28 may be incorporated within the engine controller 54.

In addition, the ECU 28 may be electrically coupled to the input sensor 36 and the output sensor 38 to receive input speed (IS) and the output speed (OS) signals, respectively. It will be appreciated that the invention is not limited by the ECU 28 receiving signals from the input and output sensors of the transmission, and that the invention can be practiced by the ECU 28 receiving signals from any rotating component of interest in the vehicle driveline.

Figure 2:
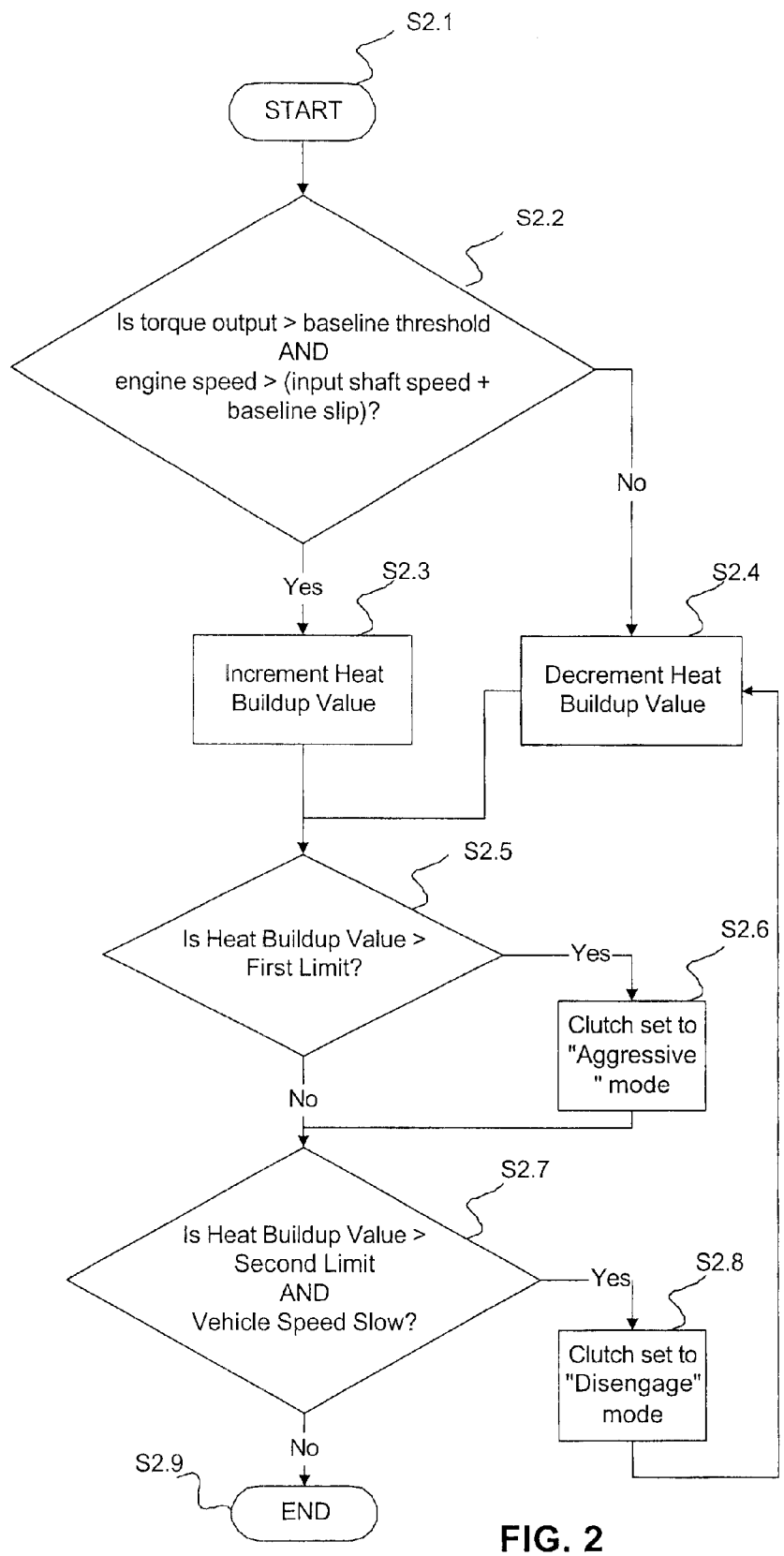
FIG. 2 is a flow chart of the heat dissipation method of the invention.

Referring now to FIG. 2, there is illustrated a method for controlling clutch heat buildup based on one or more engine operating parameters, such as engine torque output (IT), engine input shaft speed (IS) and engine speed (ES) in accordance with the invention. Initially, the method of the invention begins at Step (S2.1). Then, the ECU 28 determines if two conditions are satisfied: 1) if the torque output (IT) is greater than a baseline threshold value, and 2) if the engine speed (ES) is greater than the input shaft speed (IS) plus a baseline slip value (S2.2). The baseline threshold value can be a minimum amount of torque required to cause clutch heating, for example, approximately 35 ft-lbs. The baseline slip value can be a minimum slip required to cause clutch heating, for example, approximately 50 RPM.

If the above two conditions are satisfied, then a Heat Buildup Value in the form of a numerical value is increased (S2.3) by the ECU 28 as follows:

$$\text{New Heat Buildup Value} = \text{Old Heat Buildup Value} +$$
$$\frac{[(\text{engine speed} - \text{input shaft speed}) * \text{torque output}]}{\text{Calibration Value}}$$

where,

Calibration Value is a scaling offset value that allows for a predetermined amount of heat buildup in the clutch to occur. The Calibration Value is a function of the heat sink capability of the clutch and is a function of clutch design (materials used, and the like). The Calibration Value can be determined by one skilled in the art by taking empirical measurements of clutch temperature as a function of time for a desired engine RPM, torque output and clutch slippage (%).

In a preferred embodiment, the Heat Buildup Value is a numerical constant value that varies linearly as a function of time. However, it is envisioned that the Heat Buildup Value can also take into consideration other engine variables, such as clutch temperature, clutch wear, and the like, so as to vary non-linearly as a function of time.

If the above two conditions are not satisfied, then the Heat Buildup Value is decreased (S2.4) by the ECU 28 as follows:

Heat Buildup Value=Heat Buildup Value/Dissipation Rate Value$\geq 0$ where,

Dissipation Rate Value is a scaling offset that allows for a predetermined amount of clutch heat dissipation to occur. The Dissipation Rate Value can be determined by empirical measurements by one skilled in the art in a manner similar to the Calibration Value.

Next, the ECU 28 will determine if the Heat Buildup Value is greater than a first predetermined heat buildup limit (S2.5). If so, then the ECU 28 will set clutch engagement/disengagement to an "Aggressive" operating mode (S2.6). The "Aggressive" operating mode will cause the ECU 28 to engage or disengage the clutch at a faster rate than the rate of clutch engagement/disengagement prior to the "Aggressive" operating mode, thereby minimizing the amount of time the clutch slips and further heat buildup in the clutch.

Then, the ECU 28 will determine if the Heat Buildup Value is greater than a second predetermined heat buildup limit and the output speed (OS) is less than a preset value (S2.7). Preferably, the second heat buildup limit is greater in value than the first predetermined heat buildup limit. The preset value may be set to a vehicle speed at which the vehicle is almost stopped, for example, 1–2 MPH. If so, then the ECU 28 will set clutch engagement/disengagement to a "Full Disengage" operating mode (S2.8). The "Full Disengage" operating mode will cause the ECU 28 to fully disengage the clutch to minimize the amount of time the clutch slips, thereby minimizing further heat buildup in the clutch. The process continues to Step S2.4 and decreases the Heat Buildup Value until clutch engagement can resume. Then, the determination system ends (S2.9).

As described above, the method of the invention determines a Heat Buildup Value based on engine torque output, engine and input shaft speeds to predict clutch temperature and take preventive measures in the event that the clutch may become overheated and possibly damaged. An alternative embodiment of the method of the invention may comprise an additional step prior to Step S2.5 to allow the clutch to cool down even further until the Heat Buildup Value is less than a predetermined restart heat buildup limit in order to allow normal engage/disengage of the clutch to occur. The restart heat buildup limit can be empirically determined and is preferably less than the first predetermined heat buildup limit.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An autoclutch heat dissipation prediction method, comprising the steps of:
    determining a heat buildup value of an autoclutch based on an engine operating parameter;
    comparing the heat buildup value of the autoclutch with a first predetermined heat buildup limit; and
    setting an operating mode of the autoclutch based on said comparison step,
    wherein the operating mode comprises an "Aggressive" operating mode if the heat buildup value is greater than the first predetermined heat buildup limit.

2. The method of claim 1, wherein the engine operating parameter comprises one of a torque output, engine speed and input shaft speed.

3. The method of claim 2, wherein the heat buildup value is determined by determining whether the torque output is greater than a baseline threshold value and the engine speed is greater than the input shaft speed plus a baseline slip value.

4. The method of claim 3, wherein the heat buildup value is increased or decreased based on said determination step.

5. The method of claim 1, further comprising the step of comparing the heat buildup value with a second predetermined heat buildup limit if the heat buildup value is less than or equal to the first predetermined heat buildup limit.

6. The method of claim 5, wherein the operating mode comprises a "Fully Disengaged" operating mode if the heat buildup value is greater than the second predetermined heat buildup limit and a vehicle speed is less than a preset value.

7. A heat dissipation prediction method for a clutch, comprising the steps of:
    determining a heat buildup value of a clutch based on an engine operating parameter;
    comparing the heat buildup value of the clutch with a first predetermined heat buildup limit;
    comparing the heat buildup value of the clutch with a second predetermined heat buildup limit; and
    setting an operating mode of the clutch based on the heat buildup value,
    wherein the clutch is engaged at a rate faster than prior to said determining step if the heat build value is greater than the first predetermined heat buildup limit.

8. The method of claim 7, wherein the engine operating parameter comprises one of a torque output, engine speed and input shaft speed.

9. The method of claim 8, wherein the heat buildup value is increased if the torque output is greater than a baseline threshold value, and if the engine speed is greater than the input shaft speed plus a baseline slip value.

10. The method of claim 8, wherein the heat buildup value is decreased if the torque output is less than or equal to a baseline threshold value, and if the engine speed is greater than the input shaft speed plus a baseline slip value.

11. The method of claim 7, wherein the clutch is fully disengaged if the heat buildup value is greater that the second predetermined heat buildup limit and a vehicle speed is less than a preset value.

12. An automatic control system for predicting heat dissipation in a vehicle master clutch that comprises a microprocessor for receiving signals from at least one engine operating parameter including torque output, engine speed, input shaft speed, and vehicle speed, said microprocessor determining a heat buildup value based on the at least one engine operating parameter, said microprocessor comparing the heat buildup value with a first predetermined heat buildup limit, said microprocessor setting an operating mode of the clutch based on the comparison between the heat buildup value and the first predetermined heat buildup limit, wherein said microprocessor causes the clutch to engage at a faster rate when the heat buildup value exceeds the first predetermined heat buildup limit.

13. The system according to claim 12, wherein said microprocessor increments the heat buildup value when the torque output is greater than a baseline threshold value and the engine speed is greater than the input shaft speed plus a baseline slip value.

14. The system according to claim 12, wherein said microprocessor decrements the heat buildup value when one of the torque output is less than the baseline threshold value and the engine speed is less than the input shaft speed plus the baseline slip value.

15. The system according to claim 12, wherein said microprocessor compares the heat buildup value to a second predetermined heat buildup limit and the vehicle speed and causes the clutch to fully disengage when the heat buildup value exceeds the second predetermined heat buildup limit and the vehicle speed is less than a preset value.

16. An automatic control system for predicting heat dissipation in a vehicle master clutch, said system comprising:
   a microprocessor-based controller;
   a plurality of sensors, each sensor sensing an engine operating parameter and providing an output signal to said controller,
   wherein said controller determines a heat buildup value of a vehicle master clutch based on at least one engine operating parameter, compares the heat buildup value with a first predetermined heat buildup limit, and sets an operating mode of the vehicle master clutch based on the comparison between the heat buildup value and the first predetermined heat buildup limit, and
   wherein said controller causes the vehicle master clutch to engage at a faster rate when the heat buildup value exceeds the first predetermined heat buildup limit.

17. The system according to claim 16, wherein the engine operating parameter comprises one of a rotational speed of an engine, a rotational speed of an input shaft, a torque of an input shaft, a rotational speed of an output shaft, and a displacement of a throttle pedal.

18. The system according to claim 17, wherein said controller increments the heat buildup value when the torque is greater than a baseline threshold value and the rotational speed of the engine is greater than the rotational speed of the input shaft speed plus a baseline slip value.

19. The system according to claim 17, wherein said microprocessor decrements the heat buildup value when one of the torque is less than the baseline threshold value and the rotational speed of the engine is less than the rotational speed of the input shaft plus a baseline slip value.

20. The system according to claim 16, wherein said controller compares the heat buildup value to a second predetermined heat buildup limit and a vehicle speed and causes the vehicle master clutch to fully disengage when the heat buildup value exceeds the second predetermined heat buildup limit and the vehicle speed is less than a preset value.

21. An autoclutch heat dissipation prediction method, comprising the steps of:
   determining a heat buildup value of an autoclutch based on an engine operating parameter;
   comparing the heat buildup value of the autoclutch with a first predetermined heat buildup limit;
   comparing the heat buildup value with a second predetermined heat buildup limit if the heat buildup value is less than or equal to the first predetermined heat buildup limit; and
   setting an operating mode of the autoclutch,
   wherein the operating mode comprises a "Fully Disengaged" operating mode if the heat buildup value is greater than the second predetermined heat buildup limit and a vehicle speed is less than a preset value.

22. The method of claim 21, wherein the engine operating parameter comprises one of a torque output, engine speed and input shaft speed.

23. The method of claim 22, wherein the heat buildup value is determined by determining whether the torque output is greater than a baseline threshold value and the engine speed is greater than the input shaft speed plus a baseline slip value.

24. The method of claim 23, wherein the heat buildup value is increased or decreased based on said determination step.

25. The method of claim 21, wherein the operating mode comprises an "Aggressive" operating mode if the heat buildup value is greater than the first predetermined heat buildup limit.

26. A heat dissipation prediction method for a clutch, comprising the steps of:
   determining a heat buildup value of a clutch based on an engine operating parameter;
   comparing the heat buildup value of the clutch with a first predetermined heat buildup limit;
   comparing the heat buildup value of the clutch with a second predetermined heat buildup limit; and
   setting an operating mode of the clutch based on the heat buildup value,
   wherein the clutch is fully disengaged if the heat buildup value is greater that the second predetermined heat buildup limit and a vehicle speed is less than a preset value.

27. The method of claim 26, wherein the engine operating parameter comprises one of a torque output, engine speed and input shaft speed.

28. The method of claim 27, wherein the heat buildup value is increased if the torque output is greater than a baseline threshold value, and if the engine speed is greater than the input shaft speed plus a baseline slip value.

29. The method of claim 27, wherein the heat buildup value is decreased if the torque output is less than or equal to a baseline threshold value, and if the engine speed is greater than the input shaft speed plus a baseline slip value.

30. The method of claim 26, wherein the clutch is engaged at a rate faster than prior to said determining step if the heat build value is greater than the first predetermined heat buildup limit.

31. An automatic control system for predicting heat dissipation in a vehicle master clutch that comprises a microprocessor for receiving signals from at least one engine operating parameter including torque output, engine speed, input shaft speed, and vehicle speed, said microprocessor determining a heat buildup value based on the at least one engine operating parameter, said microprocessor comparing the heat buildup value with a first predetermined heat buildup limit, said microprocessor setting an operating mode of the clutch based on the comparison between the heat buildup value and the first predetermined heat buildup limit, wherein said microprocessor compares the heat buildup value to a second predetermined heat buildup limit and the vehicle speed and causes the clutch to fully disengage when the heat buildup value exceeds the second predetermined heat buildup limit and the vehicle speed is less than a preset value.

32. The system according to claim 31, wherein said microprocessor increments the heat buildup value when the torque output is greater than a baseline threshold value and the engine speed is greater than the input shaft speed plus a baseline slip value.

33. The system according to claim 31, wherein said microprocessor decrements the heat buildup value when one of the torque output is less than the baseline threshold value and the engine speed is less than the input shaft speed plus the baseline slip value.

34. The system according to claim 31, wherein said microprocessor causes the clutch to engage at a faster rate when the heat buildup value exceeds the first predetermined heat buildup limit.

35. An automatic control system for predicting heat dissipation in a vehicle master clutch, said system comprising:
- a microprocessor-based controller;
- a plurality of sensors, each sensor sensing an engine operating parameter and providing an output signal to said controller, wherein said controller determines a heat buildup value of a vehicle master clutch based on at least one engine operating parameter, compares the heat buildup value with a first predetermined heat buildup limit, and sets an operating mode of the vehicle master clutch based on the comparison between the heat buildup value and the first predetermined heat buildup limit, and wherein said controller compares the heat buildup value to a second predetermined heat buildup limit and a vehicle speed and causes the vehicle master clutch to fully disengage when the heat buildup value exceeds the second predetermined heat buildup limit and the vehicle speed is less than a preset value.

36. The system according to claim 35, wherein the engine operating parameter comprises one of a rotational speed of an engine, a rotational speed of an input shaft, a torque of an input shaft, a rotational speed of an output shaft, and a displacement of a throttle pedal.

37. The system according to claim 36, wherein said controller increments the heat buildup value when the torque is greater than a baseline threshold value and the rotational speed of the engine is greater than the rotational speed of the input shaft speed plus a baseline slip value.

38. The system according to claim 36, wherein said microprocessor decrements the heat buildup value when one of the torque is less than the baseline threshold value and the rotational speed of the engine is less than the rotational speed of the input shaft plus a baseline slip value.

39. The system according to claim 35, wherein said controller causes the vehicle master clutch to engage at a faster rate when the heat buildup value exceeds the first predetermined heat buildup limit.

* * * * *